United States Patent [19]
Schmitt

[11] 3,779,361
[45] Dec. 18, 1973

[54] ARTICLE HANDLING APPARATUS
[75] Inventor: Robert A. Schmitt, Vancouver, Wash.
[73] Assignee: Columbia Machine Inc., Vancouver, Wash.
[22] Filed: Aug. 20, 1971
[21] Appl. No.: 173,480

[52] U.S. Cl. .............................................. 198/24
[51] Int. Cl. ............................................. B65g 47/00
[58] Field of Search .......................... 214/1 BB, 1 B; 198/20, 24, 154; 193/35 A

[56] References Cited
UNITED STATES PATENTS
| | | | |
|---|---|---|---|
| 3,198,308 | 8/1965 | Driesch et al. | 198/24 |
| 3,216,547 | 11/1965 | DeGood et al. | 193/35 A |
| 1,862,386 | 6/1932 | Neff | 198/24 |
| 2,883,031 | 4/1959 | MacCurdy | 198/20 R |

Primary Examiner—Evon C. Blunk
Assistant Examiner—Douglas D. Watts

Attorney—Kolisch, Hartwell & Dickinson

[57] ABSTRACT

Article handling apparatus including a lowerable platform adapted to receive an article at one elevation and to lower it. A puller is provided for shifting such an article laterally and into proper position on the platform when at its one elevation. The puller includes an elongated, rocking arm having opposed article-engaging and cam-engaging ends. The arm is shiftable along a horizontal path between an extended position where its article-engaging end is under the platform and a retracted position where such end is spaced to one side of the platform. The cam-engaging end of the arm rides on a track which controls rocking of the arm, whereby its article-engaging end is below the elevation of the platform when the arm is extended and is raised above such elevation when the arm is shifted from its extended toward its retracted position. When the arm raises and retracts it frictionally engages the base of an article on the platform and shifts the article laterally on the platform.

1 Claim, 3 Drawing Figures

ARTICLE HANDLING APPARATUS

This invention relates to article handling apparatus including means for shifting articles laterally on a platform.

In many article handling operations articles may be conveyed to an article receiving station and must thereafter be shifted laterally of the station. An example of this may be found in the use of roller conveyors where an article is transported to a station, but stops prior to assuming its proper position in the station. In such instance it is necessary to provide some means for shifting the article laterally of the station.

A general object of the invention is to provide novel means for shifting an article laterally on a platform, which means is simply and economically constructed.

Another object is to provide such novel shifting means which frictionally engages the base of an article to be shifted and pulls it in the direction it is to be shifted. Such frictional engagement and pulling action provides gentle shifting for an article, which minimizes damage to articles operated upon.

Yet another object is to provide novel article handling apparatus which includes a lowerable platform adapted to receive an article at one elevation and lower it, and article shifting means operable to engage the base of an article at such elevation on the platform, shift it laterally to position the article properly on the platform, and then move laterally of the platform to a position where it is clear of the path along which the platform and article may travel on lowering the article.

These and other objects and advantages will become more fully apparent as the following description is read in conjunction with the drawings, wherein.

Figure 1:
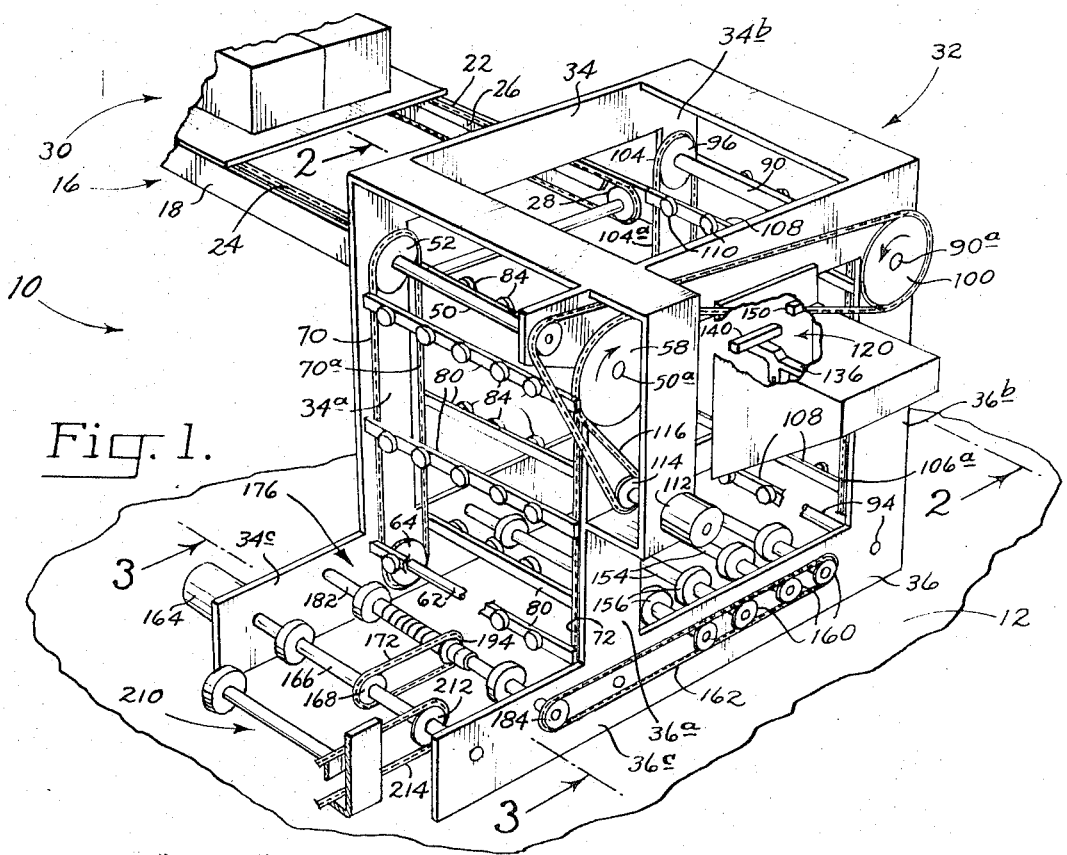
FIG. 1 is a perspective view of apparatus according to the invention, with portions broken away.

Referring now to the drawings, and first more specifically to FIG. 1, at 10 is indicated generally article handling apparatus according to the invention mounted on a floor surface 12. At 16 is indicated generally an infeed conveyor for supplying articles to the apparatus.

The infeed conveyor comprises a support frame 18 spaced above the floor. On frame 18 are supported a pair of laterally spaced, substantially parallel drive chains 22, 24. The chains have substantially horizontal upper reaches which are supported on tracks, such as that indicated generally at 26 for chain 22. Opposite ends of chains 22, 24 are trained over sprockets, such as that indicated at 28 in FIGS. 1 and 2. The chains are driven by suitable motor means whereby their upper reaches travel to the right in FIGS. 1 and 2. The chains are operable to support opposite edge margins of an article, such as a sheet metal pallet loaded with concrete blocks as indicated generally at 30 in FIG. 1, and carry it to the right in FIGS. 1 and 2 toward apparatus 10.

The article handling apparatus comprises a frame 32 having upright, laterally spaced, substantially parallel, side plates 34, 36, respectively. Plate 34 includes a pair of substantially parallel, laterally spaced, upright legs 34a, 34b, and a lower plate portion 34c. Lower portion 34c extends between legs 34a, 34b at the base of the apparatus and to the left from leg 34a in FIG. 1. Plate 36 includes a similar pair of upright laterally spaced legs 36a, 36b and a lower plate portion 36c. Lower portion 36c extends between legs 36a, 36b at the base of the apparatus and to the left from leg 36a in FIG. 1. Plates 34, 36 are positioned with legs 34a, 34b and lower portion 34c substantially aligned with legs 36a, 36b and lower portion 36c, respectively. The space between legs 34a, 34b is sufficient to permit an article on infeed conveyor 16 to be passed therebetween.

An elongated shaft 50 extends between and is journaled for rotation adjacent its opposite ends in upper portions of legs 34a, 36a. Shaft 50 is horizontal and is positioned with its longitudinal axis extending substantially parallel to and above the upper reaches of chains 22, 24 on the infeed conveyor.

A sprocket 52 is secured to shaft 50 for rotation therewith adjacent the inwardly facing side of leg 34a (the side nearest the viewer in FIG. 1). A similar sprocket (not shown) is secured to shaft 50 for rotation therewith adjacent the inwardly facing side of leg 36a (the side away from the viewer in FIG. 1). A larger sprocket 58 is secured to end 50a of shaft 50 on the outwardly facing side of leg 36a.

A similar elongated shaft 62 extends between and is journaled for rotation adjacent its opposite ends in lower plate portions 34c, 36c directly beneath shaft 52. Shaft 62 is substantially horizontal and is positioned with its longitudinal axis parallel to the longitudinal axis of shaft 50.

A sprocket 64, similar to sprocket 52 on shaft 50, is secured to shaft 62 adjacent the inwardly facing side of portion 34c, and another sprocket (not visible in the figures) is secured to shaft 62 adjacent the inwardly facing side of portion 36c. Shaft 62 and its associated sprockets are positioned substantially parallel to shaft 50 and its associated sprockets.

An endless, elongated chain 70 is trained over sprocket 52 and under sprocket 64. Chain 70 has a substantially vertical inwardly facing reach 70a. A similar endless, elongated chain 72 is trained over the sprockets secured adjacent the opposite set of ends of shafts 50, 62. Chain 72 also includes a substantially vertical inwardly facing reach, similar to reach 70a, which parallels reach 70a.

Extending between and secured adjacent their opposite sets of ends to chains 70, 72 are a plurality of elongated bars 80. The bars are secured to the chains, whereby the bars are parallel to each other. With the chains in the positions illustrated, the bars are substantially horizontal. Further, the bars are spaced apart on the chains a distance slightly greater than the height of an article which may be conveyed thereto on infeed conveyor 16.

A plurality of rollers 84 are mounted for rotation on each of bars 80, with the rollers disposed on the sides of the bars facing outwardly from the chains. Each roller is rotatable freely about an axis extending normal to the longitudinal axis of its associated bar. The rollers are mounted on their associated bars, whereby the tops of the rollers on the bars on the inwardly facing reaches of chains 70, 72 lie in a substantially horizontal plane above the upper margins of their associated bars.

A shaft 90, similar to shaft 50, extends between and is journaled for rotation adjacent its opposite ends in upper portions of legs 34b, 36b. Shaft 90 is disposed at substantially the same elevation as shaft 50 and extends parallel thereto. A shaft 94, similar to shaft 62, is journaled adjacent its opposite ends in lower portions 34c, 36c of plates 34, 36 directly beneath shaft 90. Shaft 94 is disposed at substantially the same elevation as shaft 62 and extends parallel thereto.

Sprockets similar to those previously described on shafts 50, 62 are secured to shafts 90, 94 adjacent their opposite sets of ends. Such sprockets on shaft 90 are indicated generally at 96, 98 in FIGS. 1 and 2. A sprocket 100, similar to sprocket 58, is secured to the end 90a of shaft 90 nearest the viewer in FIG. 1 and at the right in FIG. 2.

Figure 2:
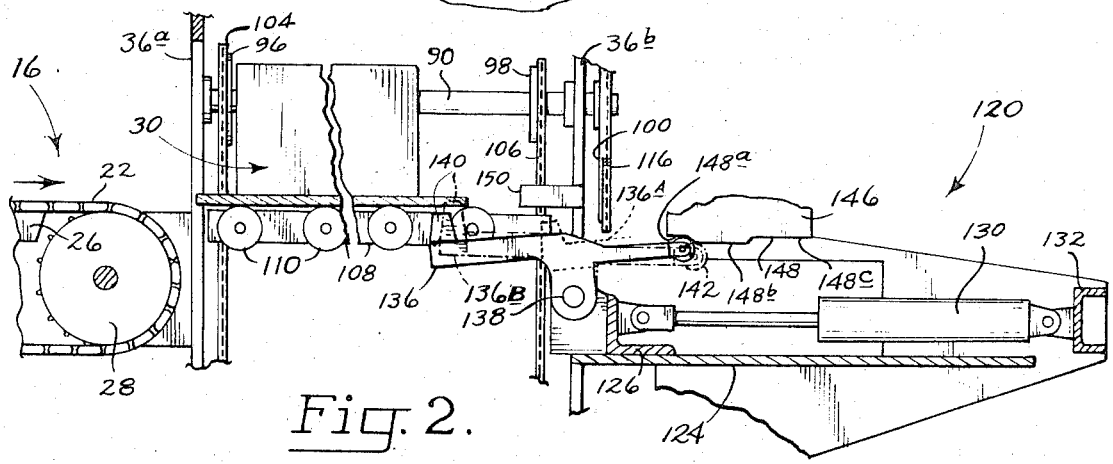
FIG. 2 is a cross-sectional view taken generally along the line 2—2 in FIG. 1, somewhat enlarged and with portions broken away.

An endless elongated chain 104, is trained over the sprockets secured to the ends of shafts 90, 94 farthest from the viewer in FIG. 1 and at the left in FIG. 2. A similar chain 106 is trained over the sprockets secured adjacent the ends of shafts 90, 94 nearer the viewer in FIG. 1 and at the right in FIG. 2. Chains 104, 106 have substantially vertical inwardly facing reaches 104a, 106a.

A plurality of bars 108, similar to bars 80, are secured adjacent their opposite set of ends to chains 104, 106. The bars are positioned on the chains substantially parallel to each other and are spaced apart on the chains the same distance as bars 80 are spaced. Each of bars 108 has a plurality of rollers 110 mounted for rotation on its side facing away from chains 104, 106. As seen in FIG. 2 the tops and bottoms of the rollers project above and below the upper and lower margins respectively, of their associated bar. Further, the rollers are so positioned on a bar that when the bar is horizontal the tops of its associated rollers lie in a common, substantially horizontal plane.

A motor 112 mounted on frame 32 has a drive sprocket 114 secured to its drive shaft. A driven chain 116 reeved over sprocket 114 and sprockets 58, 100, drivingly connects the motor to shafts 50, 90. The motor is operable to drive chain 116, whereby sprocket 58 rotates in a clockwise direction and sprocket 100 rotates in a counterclockwise direction as seen in FIG. 1, whereby bars 80, 108 on the inwardly facing reaches of the chains are lowered. The sizes of the sprockets in the apparatus are such that each bar on the inwardly facing reaches of chains 70, 72 is in opposing facing relationship with a bar on the inwardly facing reaches of chains 104, 106. Further, the bars are lowered in a synchronized fashion, whereby the tops of the rollers on a facing pair of bars are maintained in a substantially common horizontal plane.

As is best seen in FIG. 2, the upper surfaces of the rollers on a bar may be positioned at substantially the elevation of the upper reaches of chains 22, 24 of the infeed conveyor. A pair of facing bars and their associated rollers when so positioned define what may be referred to herein as a support platform for an article conveyed thereto from the infeed conveyor. Explaining further, a block-laden pallet, such as that indicated 30 in FIG. 1, may be conveyed onto the rollers of a pair of facing bars 80, 108, whereby the rollers support opposed edge margins of the pallet as illustrated for one side of the article in FIG. 2. One edge of the block-laden pallet in FIG. 2 is shown supported at the elevation of the infeed conveyor on rollers 110 in an article-receiving station in the apparatus. It should be understood that the opposite edge of the pallet also is supported at the same elevation on rollers 84 on a bar 80.

Infeed conveyor 16 is operable to supply an article to the article-receiving station of apparatus 10 with sufficient forward momentum (to the right in FIGS. 1 and 2) to carry it onto a set of rollers 84, 110. The proper position for such an article in such apparatus is with both of its ends (its right and left ends in FIG. 2) between chains 104, 106. The article in FIG. 2 is shown having stopped somewhat short of its proper position (to the left of its proper position in FIG. 2).

At 120 is indicated generally means for shifting such an article laterally of the article-receiving station, to the right in FIG. 2, to position it properly in the station. The shifting means includes a horizontal support plate 124 disposed laterally of the receiving station on which is supported a sliding frame, indicated generally at 126. Frame 126 is slidable along the upper surface of plate 124 and is secured to the rod end of a hydraulic ram 130. The cylinder end of ram 130 is secured to a stationary member 132.

An elongated arm 136, also referred to herein as article-engaging means, is pivotally mounted, on sliding frame 126 by a pin 138 which extends through arm 136 intermediate its ends. Pin 138 provides a pivot axis extending substantially horizontal and normal to the arm about which the arm may rock in clockwise and counterclockwise directions as viewed in FIG. 2. Sliding frame 126 and arm 136 are shiftable along a substantially horizontal path to the left and right in FIG. 2 upon extension and retraction, respectively, of ram 130. In FIG. 2 ram 130 is extended and arm 136, as illustrated in solid outline, is in its extended position with one of its ends within the article-receiving station. When ram 130 is fully retracted arm 136 is placed in a retracted position spaced fully to the right of the article-receiving station, as illustrated by a portion of the arm shown in dot-dashed outline at 136A.

The left end of arm 136 as viewed in FIG. 2, is referred to herein as the article-engaging end of the arm and carries a pad 140 constructed of material having a high coefficient of friction, such as rubber. A roller 142 is journaled on the opposite, or right, end of the arm.

Arm 136 may be rocked about its pivot axis, between a lowered position, as shown in solid outline in FIG. 2, and a raised position, as shown in dot-dash outline at 136B. When the arm is in its lowered position the upper surface of pad 140 is below the elevation of the base of an article in the article-receiving station at the elevation of the infeed conveyor. When the arm is in its raised position the top of pad 140 is slightly above such elevation and above the tops of the rollers supporting such article at the station.

At 146 in FIG. 2 is illustrated a cam which is operable to control rocking of arm 136 as it is shifted between its extended and retracted positions upon extension and retraction of ram 130. The cam is an elongated track member having an elongated downwardly facing surface 148 extending in the direction of travel for the arm. Surface 148 has a first portion 148a at the left end of the track member, as viewed in FIG. 2, a second, or intermediate, portion 148b at a lower elevation than portion 148a, and a third, or right end, portion 148c at substantially the same elevation as portion 148a.

Cam 146 is disposed laterally outwardly from the article-receiving station, and roller 142 on arm 136 rides on its surface 148. The cam is so positioned that when the arm is in its extended position roller 142 is adjacent portion 148a of the cam and the arm is permitted to rock to its lowered position as shown in solid outline in FIG. 2. As the arm is shifted toward its retracted position roller 142 rides downwardly and onto portion 148b of the cam surface, thus raising pad 140 to frictionally engage the base of an article in the article-receiving station. Further retraction of the ram draws the arm and article engaged thereby to the right in FIG. 2 and into proper position against a stop member 150 secured to frame 32 of the apparatus. The article is stopped by member 150 in proper position between chains 104, 106. Continued retraction of arm 136 moves its roller 142 onto portion 148c of the cam, permitting pad 140 and the article-engaging end of the arm to lower once again out of frictional engagement with the base of the article.

With the article thus properly positioned on the rollers of a pair of facing bars in the apparatus, motor 104 may be operated to lower the article. Once the article has been lowered sufficiently, ram 130 is extended, whereby the shifting mechanism once again is positioned to operate to engage and shift an article conveyed into the article-receiving station by conveyor 16.

Referring again to FIG. 1, a plurality of elongated shafts 154 extend substantially parallel to each other and horizontally between lower plate portions 34c, 36c. The shafts are journaled for rotation adjacent their opposite sets of ends in such plate portions. Secured to each of shafts 154 adjacent its opposite ends are rollers 156. The upper surfaces of rollers 156 all lie in a common, substantially horizontal plane and provide a support surface onto which an article may be lowered with the lowering of bars 80, 108.

One set of ends of shafts 154 extend outwardly, toward the viewer in FIG. 1, from plate portion 36c and have sprockets 160 secured thereto. An endless, elongated drive chain 162 engages all of sprockets 160 in such a manner that movement of the upper reach of the chain to the left in FIG. 1 rotates shafts 154 in a counterclockwise direction as viewed in FIG. 1.

At 164 is indicated a motor which is drivingly connected to a shaft 166 journaled for rotation adjacent its opposite ends in plate portions 34c, 36c. A sprocket 168 secured to shaft 166 and a chain 172 trained thereover operatively connect motor 164 to drive chain 162, through shock absorbing transmission means, indicated generally at 176.

Figure 3:
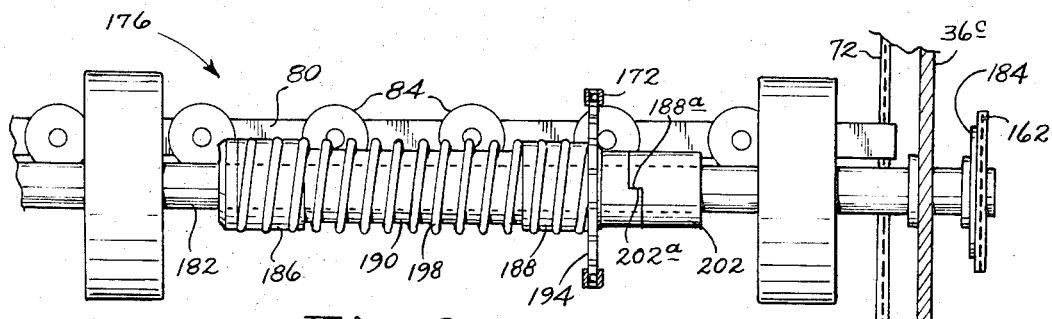
FIG. 3 is an enlarged view taken generally along the line 3—3 in FIG. 1.

Referring now to FIGS. 1 and 3, the shock absorbing transmission means includes a shaft 182 which is journaled adjacent its ends in plate portions 34c, 36c. The end of shaft 182 nearest the viewer in FIG. 1, and at the right in FIG. 3, extends through plate portion 36c and has a sprocket 184 secured thereto. Drive chain 162 is trained over sprocket 184 to provide a driving connection between shaft 182 and rollers 156.

A collar 186 is rigidly secured to shaft 182. A collar 188, spaced from collar 196, is journaled on shaft 182 for rotation relative to the shaft. An elongated tube 190 rotatably mounted on shaft 182 extends between collars 186, 188 to maintain such spaced relationship therebetween. A sprocket 194 over which chain 172 is trained is secured to collar 188 for rotation therewith about shaft 182. An elongated coiled torsion spring 198 encircling tube 190 is secured at its right end to collar 188 and at its left end to collar 186.

Operation of motor 164 to rotate shaft 166 in a counterclockwise direction as viewed in FIG. 1, drives chain 172 to impart a counterclockwise torque to sprocket 194 and collar 188. With collar 188 and sprocket 194 being journaled for rotation on shaft 182, shaft 182 will not be acted upon immediately by the full torque produced by motor 164. Instead, sprocket 194 and collar 188 will rotate relative to shaft 182 until such time as the torque in spring 198 is sufficient to overcome any resistive forces inhibiting rotation of shaft 182. One of such resistive forces may be produced by the force required to initiate movement of a heavy article deposited on rollers 156. As sprocket 194 and collar 188 are rotated relative to shaft 182 the torsional force in spring 190 increases. When sufficient torsional force is imparted to spring 198 to overcome the resistive forces inhibiting rotation of shaft 182 the shaft will rotate and will initiate movement of an article supported on rollers 156. When shaft 182 is rotated in a counterclockwise direction as viewed in FIG. 1 an article on rollers 156 will be conveyed to the left in FIG. 1, and toward the viewer in FIG. 3 along a path between chains 70, 72. Such shock absorbing transmission means in the apparatus provides a gentle start for articles lowered onto rollers 156, thus to minimize damage which otherwise might occur if a rapid, jerking start were produced.

It is generally desirable to have some torsion maintained in spring 198 prior to operation of motor 164. To accomplish this, on installation the spring is wound to impart an initial torque thereto, and a collar, such as that indicated at 202 is secured to shaft 182 to hold tension in the spring. As is seen in FIG. 3, collar 202 has a projection 202a thereon which engages a projection 188a on collar 188 to prevent rotation of collar 188 and sprocket 194 in a clockwise direction as viewed in FIG. 1 relative to shaft 182, but permits rotation of collar 188 and sprocket 194 in the reverse direction.

At 210 in FIG. 1 is indicated generally an outfeed conveyor disposed at substantially the same elevation as rollers 156. The outfeed conveyor is drivingly connected to motor 164 through a sprocket 212 secured to shaft 166 and a chain 214 trained thereover. The outfeed conveyor is adapted to receive articles discharged from the apparatus by rotation of rollers 156 and to convey such articles away from the apparatus.

Explaining now the operation of the apparatus, an article, such as block laden pallet 30, is conveyed into the apparatus by infeed conveyor 16. The forward momentum of the article carries it onto free-wheeling rollers 84, 110 on a pair of bars 80, 108 disposed with their upper surfaces at substantially the same elevation as the infeed conveyor. Since the forward momentum of the article may be insufficient to properly position the article at an article-receiving station in the apparatus, shifting means 120 is provided for shifting the article laterally of the station to properly position it.

To shift the article laterally in the station, arm 136 is shifted from its extended position, shown in solid outline in FIG. 2, toward its retracted position, to the right in FIG. 2. As the arm is shifted to the right, cam 146 produces rocking of the arm in a clockwise direction whereby its article-engaging end raises to frictionally engage the base of the article. Continued retraction shifts the article to the right in FIG. 2 and against stop 150. Further retraction of the arm moves it fully to one side of the article-receiving station to its retracted position shown in dot-dashed outline at 136A. With the arm fully retracted it is spaced completely to one side of a vertical path along which the block laden pallet may be lowered with bars 80, 108.

Motor 112 then is operated to lower the bars on the inwardly facing reaches of the chains, thus to lower the article supported on a pair of such bars toward rollers 156 at the base of the apparatus. As the article is lowered below the elevation of arm 136, the arm may be extended once again to be in position to shift an article laterally of the article-receiving station. The positioning of the shifting means on the side of the apparatus opposite the side from which articles are supplied thereto by the infeed conveyor is particularly advantageous, in that the arm may be shifted from its retracted to its extended position, ready to operate upon another article, concurrently with an article being conveyed into the apparatus from the infeed conveyor.

Operation of motor 112 lowers the article until the bars carrying the article are below the elevation of the upper surfaces of rollers 156. The article then is supported on rollers 156. When the article is supported on rollers 156, the lowermost bars on chains 70, 72 are below the level of such rollers, and the next lowest bars are above the elevation of the top of such article.

Motor 164 then is operated to drive rollers 156 in a counterclockwise direction as viewed in FIG. 1, to convey the article out of the apparatus and onto outfeed conveyor 210. Shock absorbing transmission means 176 assures that the start up for rollers 156 will be gentle, thus to minimize any damage which otherwise might occur to an article from a rapid, jerking start.

While a specific embodiment of the invention has been described herein, it should be apparent to those skilled in the art that variations and modifications are possible without departing from the spirit of the invention.

It is claimed and desired to secure by Letters Patent:

1. Article-handling apparatus comprising means defining an article-receiving station in said apparatus, conveyor means disposed laterally to one side of said station operable to transport an article substantially horizontally into said station from said side of the station with the base of the article at a certain elevation, a vertically shiftable article-support platform mounted for movement between a raised position, with an upper article-support surface thereof at said certain elevation in said station, and a lowered position below said station, said platform being adapted when in its raised position to receive and support the underside of an article transported to said station with a portion of the underside of the article exposed, and on lowering to lower such article along a substantially vertical path, and article-shifting means adapted frictionally to engage the base of an article supported on said base when in its raised position and to shift the article horizontally in said station away from said conveyor means toward the opposite side of the station, said article-shifting means including an elongate arm having a friction surface thereon adjacent one of its ends and a cam-engaging portion adjacent its other end, mounting means mounting said arm for generally horizontal movement between an extended position with said friction surface in said station and a retracted position spaced laterally outwardly from said opposite side of said station and for pivoting about a substantially horizontal axis extending transversely of the arm intermediate its ends whereby the arm may be swung vertically between a raised position with said friction surface above said certain elevation and a lowered position with said friction surface below said elevation, said arm extending generally in the direction in which it is moved, power-operated means operatively connected to said arm for shifting the same between its said extended and retracted positions, and cam means including a track along which said cam-engaging portion travels as the arm is moved between its extended and retracted positions, said track having an elongated downwardly facing surface extending in the direction of travel for the arm, with said surface having a first portion disposed at a first elevation and a second portion spaced laterally outwardly from said first portion and at a lower elevation, operable to swing said arm to its said lowered position on shifting of the arm to its said extended position, and to swing the arm to its raised position with movement thereof away from its said extended position whereby said friction surface may engage the underside of an article and pull it toward said opposite side of the station, said power-operated means, cam means, arm and mounting means being disposed laterally outwardly of said vertical path for an article when said arm is retracted.

* * * * *